(12) United States Patent
Klett et al.

(10) Patent No.: US 6,491,891 B1
(45) Date of Patent: Dec. 10, 2002

(54) GELCASTING POLYMERIC PRECURSORS FOR PRODUCING NET-SHAPED GRAPHITES

(75) Inventors: James W. Klett, Knoxville, TN (US); Mark A. Janney, Knoxville, TN (US)

(73) Assignee: UT-Battelle, Inc., Oak Ridge, TN (US)

( * ) Notice: Subject to any disclaimer, the term of this patent is extended or adjusted under 35 U.S.C. 154(b) by 0 days.

(21) Appl. No.: 09/393,558

(22) Filed: Sep. 10, 1999

(51) Int. Cl.$^7$ ............................................... C01B 31/02
(52) U.S. Cl. .................................. 423/445 R; 423/448
(58) Field of Search ........................... 423/445 R, 448; 516/99, 104

(56) References Cited

U.S. PATENT DOCUMENTS

| | | | |
|---|---|---|---|
| 4,124,691 A | * 11/1978 | Geen et al. .............. | 423/445 R |
| 4,894,194 A | 1/1990 | Janney | |
| 5,028,362 A | 7/1991 | Janney et al. | |
| 5,145,908 A | 9/1992 | Jenny et al. | |
| 5,352,524 A | * 10/1994 | Nagata ....................... | 428/408 |
| 5,556,704 A | 9/1996 | Prevorsek et al. | |
| 5,744,421 A | 4/1998 | Robinson et al. | |
| 5,759,622 A | 6/1998 | Stover | |

OTHER PUBLICATIONS

Baskin et al., "Forming Single–Phase Laminates via the Gelcasting Technique," *J. Am. Ceram. Soc.* 80:11:2929–32 (1997).

Fisher, Ronald, "Manufacturing Considerations for Carbon–Carbon," *Essentials of Carbon–Carbon Composites*, 103–117 (Thomas, C.R., ed. Royal Society of Chemistry, Cambridge, 1993).

Huttinger et al., "Theoretical and Practical Aspects of Liquid–Phase Pyrolysis as Basis of the Carbon Matrix of CFRC," *Carbon Fibers, Filaments and Composites*, 301–326 (1990).

Janney, Mark A., "Gelcasting Superalloy Powders," *P/M in Aerospace, Defense and Demanding Applications*, 139–146 (1995).

Janney et al., "Gelcast Tooling; Net Shape Casting and Green Machining," *Materials and Manufacturing Processes*, 13:3:389–403 (1997).

Krell et al., "The Influence of Shaping Method on the Grain Size Dependence of Strength in Dense Submicrometre Alumina," *Journal of the European Ceramic Society*, 16:1189–1200 (1996).

Murdie, N. et al., "Carbon–Carbon Matrix Materials," *Carbon–Carbon Materials and Composites*, 105–167 (1989).

Nunn et al., "Gelcasting of Silicon Compositions For SRBSN," *Powder Synthesis and Shape Forming Processes*, 255–62 (Amer. Ceramic Soc., 1996).

Rand, Brian, "Matrix Precursors for Carbon–Carbon Composites," *Essentials of Carbon–Carbon Composites*, 67–102 (Thomas, C.R., ed. Royal Society of Chemistry, Cambridge, 1993).

Thomas, C.R., "What Are Carbon–Carbon Composites and What Do They Offer," *Essentials of Carbon–Carbon Composites*, (Thomas, C.R., ed. Royal Society of Chemistry, Cambridge, 1993).

Young et al., "Gelcasting of Alumina," *J. Am. Ceram. Soc.*, 74:3:612–618 (1991).

* cited by examiner

*Primary Examiner*—Stuart L. Hendrickson
(74) *Attorney, Agent, or Firm*—Quarles & Brady LLP

(57) ABSTRACT

The present invention discloses a method for molding complex and intricately shaped high density monolithic carbon, carbon-carbon, graphite, and thermoplastic composites using gelcasting technology. The method comprising a polymeric carbon precursor, a solvent, a dispersant, an antifoaming agent, a monomer system, and an initiator system. The components are combined to form a suspension which is poured into a mold and heat-treated to form a thermoplastic part. The thermoplastic part can then be further densified and heat-treated to produce a high density carbon or graphite composite. The present invention also discloses the products derived from this method.

88 Claims, 12 Drawing Sheets

GELCASTING POLYMERIC PRECURSORS FOR PRODUCING NET-SHAPED GRAPHITES

STATEMENT REGARDING FEDERALLY SPONSORED RESEARCH AND DEVELOPMENT

The disclosed invention was made. with government support under contract DE-AC05-96OR22464, awarded by the United States Department of Energy to Lockheed Martin Energy Research Corporation. The United States Government has certain rights to this invention.

CROSS-REFERENCE TO RELATED APPLICATION

Not Applicable.

FIELD OF THE INVENTION

The invention relates to densified carbon and graphite composites, and their method of manufacture. In particular, the invention relates to a method of manufacturing carbon and graphite composites using a gelcasting process.

BACKGROUND OF THE INVENTION

Products constructed from carbon and/or graphite composites possess high thermal conductivity, significant heat capacity and excellent friction and wear properties. Because of these characteristics, such composites are often used in speciality applications ranging from the heat shields on the leading edges of the Shuttle Orbiter to exit cones for rocket engines. More commonly, however, these composites are used as frictional materials in the braking systems for military and large commercial aircraft where their unique characteristics provide significantly improved braking performance.

The manufacture of carbon and graphite composites is a lengthy process, and generally involves several cycles of densification and carbonization under substantially high pressure levels. The typical process begins by preparing a carbon preform using a hand lay-up of woven carbon fiber fabric or by hot pressing a mixture of chopped carbon fibers and resin. The preform is then densified by repeated liquid impregnation with pitch or resin, or by carbon vapor infiltration. Following densification, the preform is carbonized or graphitized by heating the preform to temperatures in excess of 600° C. and as high as 3000° C., as described by K. J. Huttinger, "Theoretical and Practical Aspects of Liquid-Phase Pyrolysis as a Basis of the Carbon Matrix of CFRC," in *Carbon Fibers, Filaments and Composites*, 301, 301–326 (Figueiredo ed., Kluwer Academic Publishers, Boston 1990), and Brian Rand, "Matrix Precursors for Carbon-Carbon Composites," in *Essentials of Carbon-Carbon Composites*, supra at 67–102. This densification/carbonization process is repeated until the desired density is achieved (normally 1.8 g/cc). Typically, the complete process requires up to five densification/carbonization cycles over a 6 to 9 month period. As such, products containing carbon or graphite composites tend to carry an extremely high cost.

Other methods of producing carbon or graphite composites have recently been developed so as to avoid the high costs and time expense associated with their manufacture. For example, U.S. Pat. No. 5,556,704, Prevorsek, et al., discloses a method for manufacturing carbon-carbon composites by hot pressing a mixture of carbon fiber and carbon precursor material. Essential to this process is the application of a uniaxial compressive force and a lateral restraining force to the mixture during the heating process. The compressive force is generated by a conventional press apparatus, while the lateral restraining force is generated by a hydraulic piston arrangement. Ultimately, the application of these pressure forces, along with other densification/carbonization processes, results in a high density plate or rod structure.

The recently developed methods, however, are limited in that they require the use of a hot press and thus only allow the production of objects maintaining certain shapes suitable for extrusion or hot pressing, i.e., rods or plates. The manufacturer is therefore required to machine the resulting billet to achieve any product having a complex shape or structural feature, such as a threaded part or a turbine rotor. The additional machining, in turn, consumes more time and increases the final cost of the product.

The high cost of carbon and graphite composites has so for restricted their use to aircraft brakes and other relatively cost insensitive and/or performance driven applications. The benefits of these composites, however, may be readily transferred to the commercial sector if the cost of their manufacture was substantially reduced. For example, commercial applications may include clutch and braking systems for heavy trucks, or railroad locomotives and rail cars. The military may also find numerous applications in brakes and clutches on its fighting vehicles, such as tanks, armored cars, and self propelled artillery.

Affordable graphite or carbon objects having highly complex shapes are also desirable. These shapes may include the intricate designs of a turbine blade or a product having a threaded part. Current methods of manufacture, however, are unable to readily produce such objects. An ideal solution to this problem would include a new method which allows the casting of carbon and graphite composites in a mold such as that used in gelcasting technology.

Gelcasting is a traditional process for producing ceramic components having complex or intricate designs. Specifically, gelcasting is a method of molding ceramic powders into wet "green" products wherein a monomer solution serves as a binder vehicle, and its controlled polymerization in solution is used as a setting mechanism. The resulting green product is of exceptionally high strength and is typically dried to remove water. After drying, the product is normally heated further to burn off the polymer and is sometimes subsequently fired to sinter the product to a higher density.

Gelcasting methods are well known in the art and are described in Janney, U.S. Pat. No. 4,894,194, Janney et al, U.S. Pat. No. 5,028,362, and Janney et al., U.S. Pat. No. 5,145,908; A. C. Young et al. "Gelcasting of Alumina," *J. Am. Ceram. Soc.*, 74 [3] 612–18 (1991); (describing the gelcasting of ceramics such as alumina) Mark A. Janney et al. "Gelcast Tooling: Net Shape Casting and Green Machining," in Materials and Manufacturing Processes, (1997) (describing the use of a water-based gelcasting system to form parts using H13 tool steel powder); S. D. Nunn et al., "Gelcasting of Silicon Compositions for SRBSN," Ceram. trans., 62, 255–62 (1996) (describing the use of an alcohol-based gelcasting system and a water-based gelcasting system to form parts using silicon powder); M. A. Janney, "Gelcasting Superalloy Powders," in *P/M in Aerospace, Defense and Demanding Applications*, 1995 (Metals Powder Industries Federation, Princeton, N.J., 1995) (describing the use of a water-based gelcasting system to form parts), which are all incorporated herein by reference.

The typical gelcasting process involves the formation of a slurry mixture including ceramic powder, a dispersant for the ceramic powder, and a monomer solution. The monomer solution includes one or more monomers, a free-radical initiator, and an aqueous solvent. Upon its combination, the slurry mixture is transferred to a mold where it is heat-treated at a temperature and for period of time sufficient to polymerize the monomer(s) and form a firm polymer-water gel matrix. The resulting green product is then heat-treated further to achieve a final ceramic product.

With a modification and refinement of the gelcasting process it is possible to extend gelcasting technology to the manufacture of carbon and graphite products. Accordingly, the limitations related to current methods for fabricating graphite and carbon composites can be virtually eliminated.

BRIEF SUMMARY OF THE INVENTION

It is an object of this invention to provide a method, and a product of that method, for manufacturing carbonaceous preforms using gelcasting technology.

It is another object of this invention to provide a method, and a product of that method, for manufacturing high density carbon and graphite composites using gelcast technology.

It is another object of this invention to provide gelcasting compositions, and methods of gelcasting, which allow the production of high density carbon and graphite composites.

It is another object of this invention to provide a method of manufacturing high density carbon and graphite composites having complex and intricate shapes.

It is still another object of this invention to provide a method of manufacturing high density carbon and graphite composites, which is less time consuming and results in an affordable product.

It is still yet another object of this invention to provide a method, and a product of that method, for manufacturing high density carbon and graphite composites using mesophase pitch powder or other polymer precursors without having an oxidative stabilization step.

These and other objects are accomplished by the present invention. The present invention is summarized in that it provides a novel method of manufacturing high density carbon and graphite composites utilizing a gelcasting method which allows the production of articles having complex and intricate shapes. Specifically, the present invention discloses a method for manufacturing high density carbon and graphite composites from a gelcast suspension comprising a polymeric carbon precursor, a solvent, a dispersant, an anti-foaming agent, a monomer system which is soluble in the solvent, and an initiator system. The suspension is formed by combining a volume of the polymeric carbon precursor with an appropriate volume of the solvent, the monomer system, the dispersant and the anti-foaming agent. The initiator solution is then mixed into the suspension and the suspension poured into a mold where it is heat polymerized to form a thermoplastic part. The thermoplastic part can then be further densified and heat-treated to produce a high density carbon or graphite composite.

In one embodiment of the present invention, the gelcast suspension is supplemented with additives to modify and enhance the properties of the composite material.

One advantage of the present invention is that it provides a method for manufacturing carbon or graphite composites which do not require the use of a hot press.

Another advantage of the present invention is that it provides a method for manufacturing carbon or graphite composites, or net shaped fiber (or particulate) reinforced polymeric parts, without the requirement of an oxidative stabilization step.

Yet another advantage of the invention is that it provides a method for manufacturing complex and intricately shaped thermoplastic parts which, when heat-treated, are further developed into near net-shaped monolithic carbon, carbon-carbon, or graphite parts, having superior physical characteristics.

Still yet another advantage is that the present invention provides a more affordable process for manufacturing carbon or graphite composites in a shorter period of time.

These and other objects and advantages of the invention are readily understood in view of the following figures and detailed description.

DETAILED DESCRIPTION OF THE INVENTION

Figure 1:
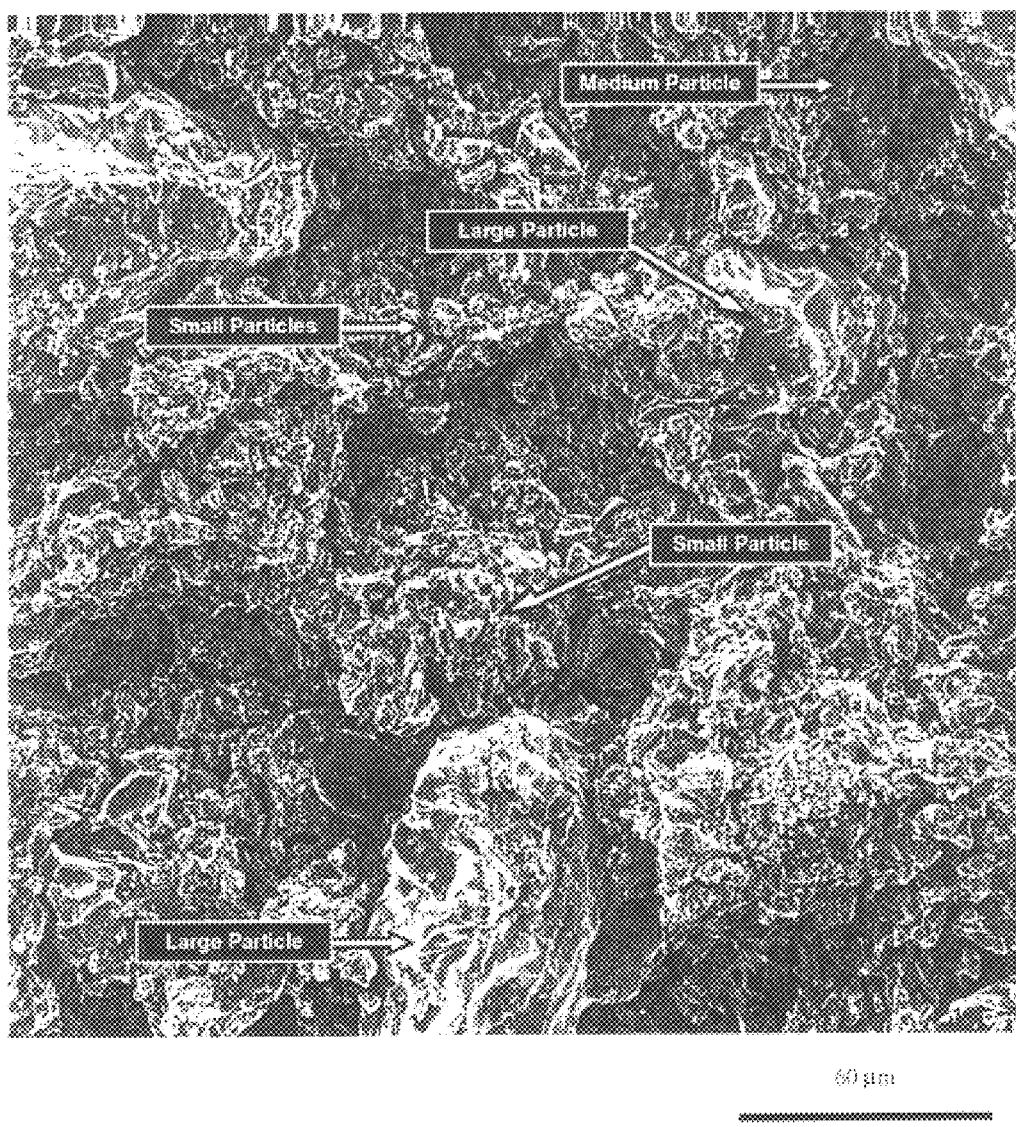
FIG. 1 is a photograph of the gelcast carbon preform microstructure taken at a low magnification along a fracture surface after the preform was heat-treated at 2800° C.

Composites manufactured according to the method of the present invention comprise a polymeric carbon precursor, a solvent, a dispersant, a monomer system soluble in the solvent, an anti-foaming agent, and an initiator system. In addition, one or more additives may also be added to enhance the properties of the composite material.

The polymeric carbon precursor (precursor) is generally defined as a material capable of being incorporated into a gelcast solution and producing carbon when heat-treated to temperatures greater than 500° C. These include thermoplastic polymers and pitches (including pitch solutions), thermosetting polymers, and any mixture thereof. Examples include, but are not limited to, phenolic resins, polyvinyl alcohols (PVA), polyimids (PI), polyaramides, polyacrylnitrile (PAN), polyetheretherkeytone (PEEK), polyarylacetylene (PAA), polycyanates, cyanate-esters, and mesophase pitches, solvated pitches, and isotropic pitches, such as coal tar, petroleum, or synthetics. Preferably, the precursor is a mesophase pitch, having an average size of approximately 10 to 50 micrometers (microns).

The precursor is typically incorporated at a volume in the range of about 40% to 65% by volume. The very wide range of precursor loading useful in practicing the claimed invention is directly dependent on the nature of the precursor one is using. The amount of precursor is also dependent upon whether or not the composition is supplemented with additives to modify and enhance the properties of the composite material as described below.

The monomer is most preferably hydroxymethylacrylamide (HMAM), but may also include any monomer with vinyl, allyl, acrylate, acrylamide, or acrylic functionality. The monomers may include, but are not limited to, acrylic acid; methacrylamide; methacrylic acid; methoxy (polyethylene glycol)monomethacrylate; n-vinyl pyrrollidone; acrylamide; alkyl-acrylamides; alkyl-methacrylamides; alkyl-acrylates; alkyl-methacrylates; dimethyl aminoethyl methacrylate; dimethyl aminopropyl methacrylamide; hydroxy-alkyl acrylamides; hydroxy-alkyl methacrylamides; hydroxy-alkyl acrylates; hydroxy-alkyl methacrylates; methacrylatoethyl trimethyl ammonium chloride; methacrylamidopropryl trimethyl ammonium chloride; p-styrene sulfonic acid; and p-styrene sulfonic acid salts. Mixtures of monomers are also possible.

The precursor and the monomer solution is typically mixed with a dispersant to form a gelcast suspension. The monomer solution provides a low viscosity vehicle for the precursor. Additionally, when heated, the monomer solution polymerizes and gels to form a firm, strong polymer/solvent gel matrix. The gel matrix immobilizes the precursor, and any other additives, in the desired shape of the mold in which the slurry mixture is heated.

The initiator system is added to initiate polymerization. The initiator is preferably a free-radical initiator. Suitable free-radical initiators include, but are not limited to: tetramethylethylenediamine (TEMED) and ammonium persulfate (APS) mixtures; sodium persulfate; sodium persulfate and TEMED mixtures; potassium persulfate; potassium persulfate and TEMED mixtures; azobis[2-(2-imidazolin-2-yl) propane] HCl (AZIP); and azobis(2-amidinopropane) HCl (AZAP); 4,4'-azo-bis-4-cyanopentanoic acid; azobisisobutyramide; azobisisobutyramidine-2HCl; 2-2'-azo-bis-2-(methylcarboxy)propane; 2-hydroxy-1-[4-(hydroxyethoxy) phenyl]-2-methyl-1-propanone; and 2-hydroxy-2-methyl-1-phenyl-1-propanone. Mixtures of initiators are also possible.

Some additives or monomers can also initiate polymerization, in which case a separate initiator is not necessary. The initiator should control the reaction in addition to initiating it. Some sources of free-radicals result in an uncontrolled reaction, and are generally unsuitable to serve as initiators.

The initiator is preferably provided in amounts between about 0.005 wt. % and about 0.5 wt. %, based upon the weight of the total solution.

Other initiator systems, in addition to free-radical initiator systems, are also suitable. These include ultraviolet (UV), x-ray, γ-ray, electron beam, or other forms of radiation which could serve as suitable polymerization initiators.

Dispersants, flocculants, and suspending agents are added to gelcasting suspensions to control the flow behavior of the suspension. Dispersants make the suspension flow more readily; flocculants make the suspension flow less readily; suspending agents prevent particles from settling out of the suspension. These additives are typically incorporated at about 0.01 to about 10 wt. % of the precursor in the suspension.

Various dispersants are known in the art and are appropriate for use in the present invention. One should exercise care, however, in order to select a dispersant which does not interact with the components of the monomer solution or, more importantly, the initiator. A particular dispersant may be evaluated for suitability with a particular precursor and a particular monomer solution by mixing small amounts of the respective components and judging the flow properties of the resultant mixture, whether the resultant mixture exhibits a notable yield point, and/or whether the mixture is dilatant. Suitable dispersants may include, but are not limited to, inorganic or organic acids, inorganic or organic bases, and other dispersants well known in the art, such as naphthalene sulfonates, sulfosuccinates, and polyphosphates, and mixtures thereof. Preferably, the dispersant utilized is Emphos CS1361 (Witco).

Additives may be included in the initial solution to modify and enhance the properties of the composite material. Examples of suitable additives include, but are not limited to, carbon fibers, carbon flakes, graphite powders, graphite flakes, graphite mesobeads, carbon nanotubes, carbon fullerenes (buckyballs), graphite whiskers, carbon nonfibers, and carbon fiber whiskers. Other examples include ceramic versions of the aforementioned carbon additives, pre-ceramic polymers, pre-metallic polymers and other additives which have a tendency to reinforce the properties of the composition.

The amount of the additive used in a particular application can vary widely. In general, additive levels will vary from parts per million to tens of percent by weight, and will depend directly on the role that the additive is playing in the system. For example, in one preferred embodiment of the invention, carbon fibers are added to the gelcast solution to reinforce the carbon matrix and provide a stronger and more dense composition. To achieve maximum strengthening and uniform distribution of the fiber, a 20:1 wt. % ratio of carbon fiber to precursor is preferred. A ratio less than 20:1 may result in decreased strength but a more uniform fiber distribution, while a larger ratio may result in increased strength and less uniformity.

Foam control agents are added to gelcasting suspensions to remove bubbles in the suspension. Foam control agents are typically added from about 0.01 to about 2 wt. % of the suspension.

The gelcast suspension is formed by combining the precursor, solvent, monomer(s), and dispersant in any suitable manner. In the preferred embodiment, the dispersant is dissolved in the monomer and solvent to form the monomer solution, and then supplemented with several drops of anti-foaming agent. Next, the precursor is added. In the preferred embodiment the precursor is added in stages and preferably at a volume approximate to 20% of the final suspension volume. After each addition of precursor to the monomer solution, the suspension is milled until it becomes less viscous, typically more than four hours.

In the preferred embodiment, the suspension is ball milled using milling media, such as alumina balls (¼" diameter). In the alternative, the suspension may also be milled using traditional techniques, such as ultrasonic milling or stirring. When the solution becomes less viscous, more precursor is added and the process is repeated until a volume fraction of approximately 40–65% by volume precursor is reached and the suspension is "castable", i.e., capable of being casted in a mold.

Upon reaching a castable state, the appropriate initiator is added and mixed into the suspension until the suspension is homogeneous. The homogeneous gelcast suspension is then preferably de-aired by applying a vacuum at the vapor pressure of water. Finally, the milling media is removed and the gelcast suspension is prepared for casting.

To cast the suspension, the suspension is poured into any desirable mold with an appropriate mold release applied to its surface. The mold is covered with an oxygen barrier and heated at an appropriate temperature and for a time sufficient to allow the monomer(s) to polymerize and form a firm polymer-solvent gel matrix.

The exact temperature at which the polymerization occurs depends on the particular initiator compound, and the particular monomer(s) which are included in the gelcast suspension. The polymerization reaction is preferably accomplished at temperatures between the freezing point and the boiling point of the solvent system being used. The free-radical initiator is activated by heating, and a temperature of about 50° C. is useful for many systems. Generally, polymerization temperatures of between about 1° C. and about 100° C. are preferred, and temperatures of between about 15° C. and 80° C. are most preferred.

The gel time necessary to form a firm polymer-solvent gel matrix is dependant upon the particular monomer(s), solvent and initiator compound. Generally, the gelcast suspension should be heated for at least 1 minute, and preferably is heated for a period of about 1 to 120 minutes, in order to polymerize the monomers and form the firm polymer-solvent matrix.

The gel can be formed under vacuum, or at pressures greater than atmospheric, and as high as about 300 PSI. Unlike most other carbonization and graphitization processes, the reaction can be carried out at atmospheric pressure, although other pressures can be utilized to reduce hydrogels having different properties.

After heating, the solid product may be cooled to ambient temperatures. At this point, the product is in a wet, "green" condition in that it contains solvent and is still unsintered. The green product, or gelcast pitch, is now ready for further heat treatments carried out in a non-oxidizing environment, such as in nitrogen or argon, which avoids carbon burn off.

During the initial heat treatment phase, also called the polymer burn-out stage, the gelled polymer binder is vaporized with very minimal residue, leaving a uniform distribution of precursor particles. The part is slowly heated from room temperature until the polymer binder is pyrolized, normally between 150° C. and 400° C., and until the precursor softens and fuses together to form a thermoplastic part. Preferably, the part is heated at a temperature increase of less than 2° C./min in order to prevent the formation of thermal stress cracks resulting from the low thermal conductivity of the gelcast pitch.

If desired, the thermoplastic part can then be further heat-treated at a temperature and for a time sufficient to convert the precursor to carbon. Once again, the temperature increase is performed slowly. Carbonization of the precursor occurs as the temperature begins to increase above 600° C. to 1200° C. During carbonization the precursor is completely converted to carbon as the non-carbon species ($CO$, $CO_2$, $HCN$, $H_2$, etc) are driven off. The resulting solid carbon product has suitable porosity with a narrow distribution of pores, which also serves to allow any gases to escape without causing excessive pressures and, therefore, cracks and failures.

The solid carbon product may then be further heat-treated to convert the carbon to graphite. This step involves slowly increasing the temperature of the solid carbon product to an appropriate temperature for a time sufficient to graphitize the carbon product. Typically, this occurs at a temperature above 2000° C., and as high as 3000° C.

In one embodiment of the invention, additives are included in the gelcast suspension to modify and enhance the properties of the composite material. For example, the addition of carbon fibers into the gelcast suspension will allow the production of near net shaped high density carbon-carbon composites. Such composites are useful in many applications, including the aerospace community. For example, the nose cones for the space shuttle are made from a carbon-carbon composite. However, these nose cones are expensive to manufacture due to their unique conical shape. The present invention allows the formation of these near net-shaped conical nose cones, or any nose cone with virtually any shape, in one casting operation. Simply, the part would be cast, heat treated, and densified. Very little machining would be required, saving thousands of dollars on each part.

In another embodiment, the thermoplastic part is collected following the burn-out stage and distributed for commercial use as a gelcast polymeric product. The structure of the part may also be enhanced by supplementing the gelcast suspension with additives to modify and enhance the structural integrity of the material. For example, during the formation of the suspension, carbon fibers or particles may be added to form a near net-shaped, carbon fiber (or particulate) reinforced thermoplastic product. This process is much easier than the typical process which involves injection molding of fiber filled molten plastics that are unduly viscous and require high temperature injection molders. In the present invention, only a single furnace is necessary during the polymer burn-out stage to pyrolize the polymer binder.

In yet another embodiment of the present invention, the thermoplastic part is collected after the binder burn-out stage, machined to a desired shape, and then returned to the furnace for further heat-treatment to carbonize or graphitize the final product. This is likely to occur if a more complex or intricate shape is required, or to refine the part to remove any imperfections caused by the gelcasting process.

Preferably, a preform manufactured according to the present invention is subjected to subsequent densification using standard techniques. Such techniques are well known in the art and include, but are not limited to, chemical vapor infiltration or liquid impregnation. See Colin R. Thomas, "What are Carbon-Carbon Composites and What Do They Offer?," in *Essentials of Carbon-Carbon Composites* 1, 1–36 (C. R. Thomas ed., Royal Society of Chemistry, Cambridge 1993); Ronald Fisher, "Manufacturing Considerations for Carbon-Carbon," in *Essentials of Carbon-Carbon Composites,* supra at 103, 103–117; Murdie, N., et al., "Carbon-Carbon Matrix Materials," in *Carbon-Carbon Materials and Composites,* 105, 105–168 (J. D. Buckley ed., Noyes Publications, New York 1989), incorporated herein by reference.

Densification can be performed using any common densification material including, but not limited to, polymer compounds, ceramics, metals, carbons or graphites. Preferably, the preform is densified by liquid impregnation with pitch or resin, or by carbon vapor infiltration.

The process of densification will increase the strength and thermal conductivity of the final product dramatically, producing a graphitic component useful in many applications. Examples of some applications, include furnace furniture—elements, shelves, boats, crucibles, etc., structural materials—anyplace typical graphites are used, graphite turbine rotors for high temperature turbines, among others.

The most significant aspect of this invention is its ability to "cast" a complex or intricately shaped part which is heat-treatable so as to form a high density near net-shaped monolithic carbon, carbon-carbon or graphite composite. Moreover, this process eliminates expensive machining steps and allows the formation of "binderless" carbon and graphite materials without the requirement of a pressing step typically found in other processes. The absence of these requirements ultimately results in reduced manufacturing expenses, a decrease in manufacturing time, and a more affordable product.

Another key aspect of the present invention is that the disclosed method avoids the use of an oxidative stabilization step. An oxidative stabilization step is often required when producing carbon and graphite composites from thermoplastic polymers, such as pitches, in order to ensure the composites uniform strength and integrity. This step typically includes heating the preform product in an oxygen environment, and at a temperature range of about 175° C. to 300° C. for approximately 8 to 100 hours, or until an 8% mass gain is observed. Here, this step is not required.

The distribution of composite particles throughout the product, and its microstructure, is also unique and provides superior quality over other preform products manufactured by other techniques. For example, the method of the present invention provides optimal packing of composite particles and a narrow distribution of pore sizes. FIGS. 1–12. The narrow distribution of pore sizes is, in turn, optimal for further densification processes. In particular, the densification process will not be impeded by narrow slits in the material and, thus, faster densification cycles will result (i.e., the densification will uniformly densify all surfaces and not have to wait for a large void to be filled as the small voids become fitted).

Figure 7:
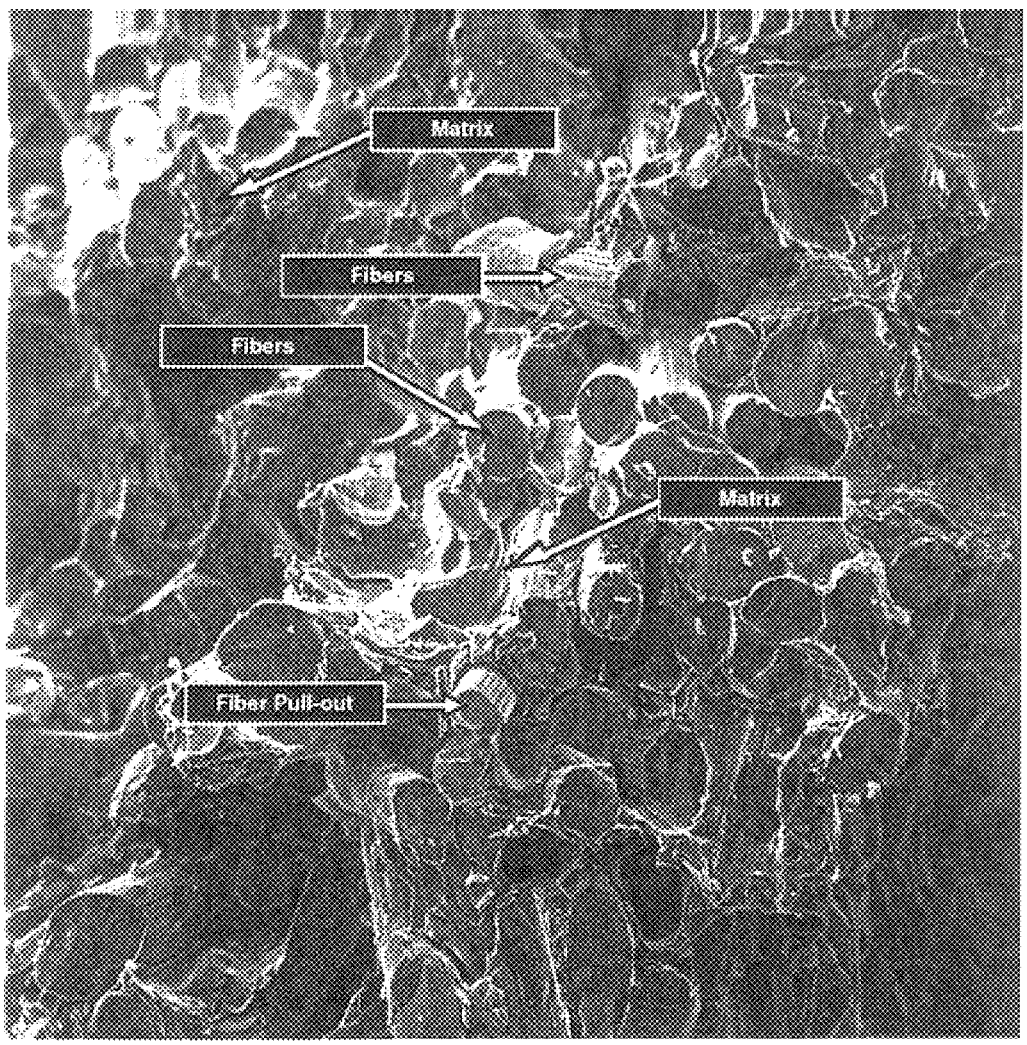
FIG. 7 is a photograph of the gelcast carbon-carbon preform microstructure taken at a low magnification along a fracture surface after the preform was heat-treated at 2800° C.
Figure 8:
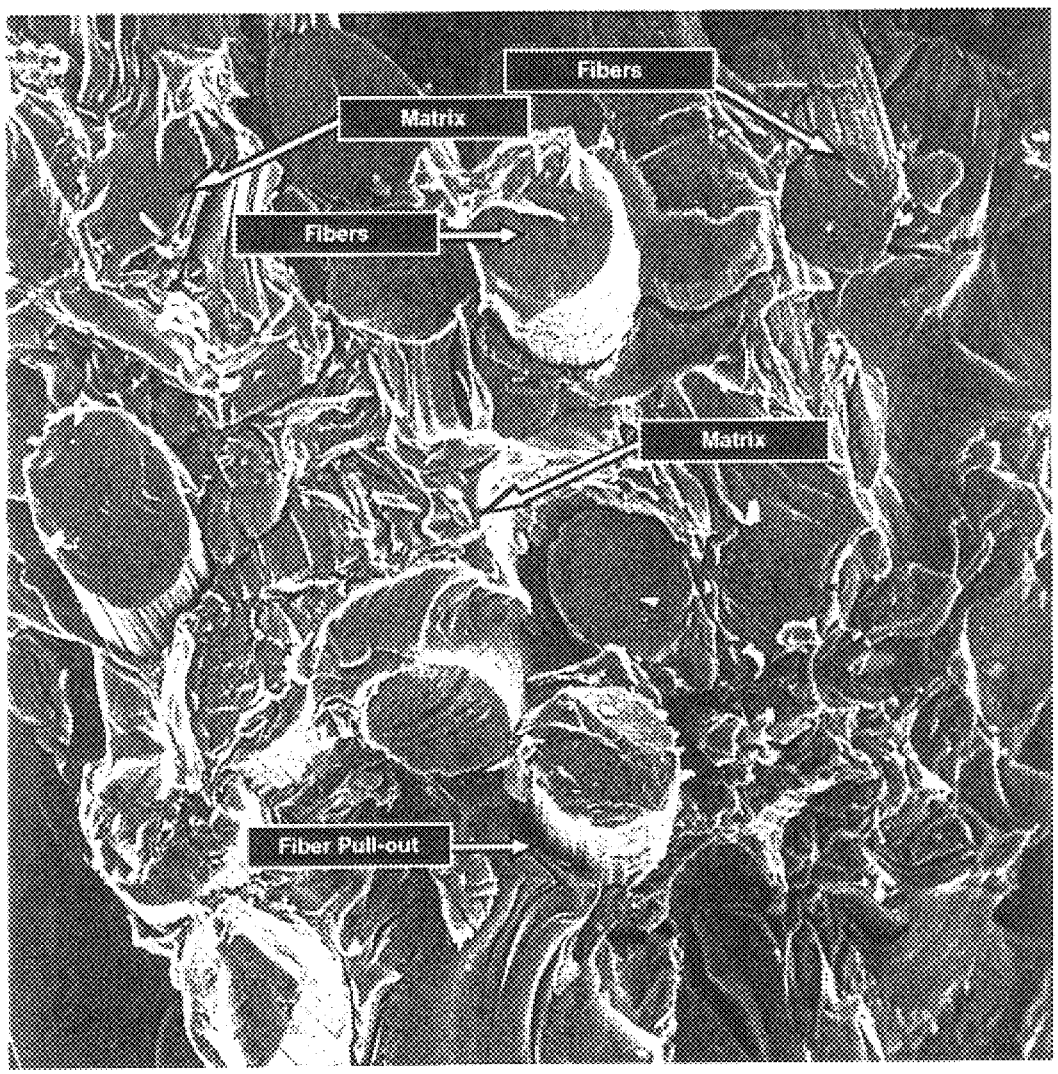
FIG. 8 is a photograph of the gelcast carbon-carbon preform microstructure taken at a medium magnification along a fracture surface after the preform was heat-treated at 2800° C.
Figure 9:
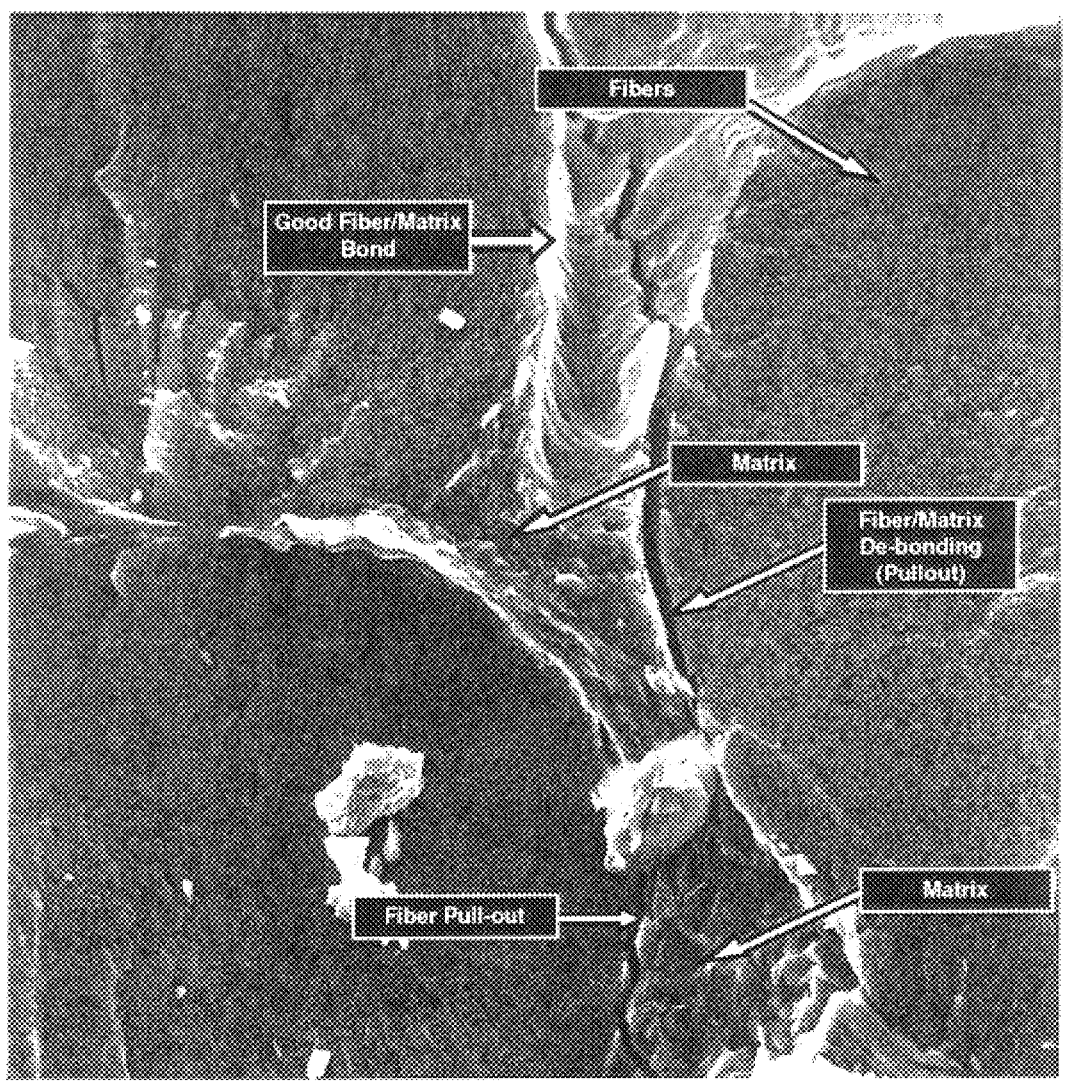
FIG. 9 is a photograph of the gelcast carbon-carbon preform microstructure taken at a high magnification along a fracture surface after the preform was heat-treated at 2800° C.

The present invention also results in a preform having a unique microstructure. Specifically, the present invention results in a carbonized or graphitized product having its small, medium and large precursor particles coalescing at their contact points to form a monolithic structure. FIGS. 1–3, 7–9. These particles also wet and bind to additives, such as carbon fibers, to form a reinforced structure. FIGS. 7–9. The structure, in turn, results in improved strength and stiffness, as well as enhanced thermal conductivity.

By way of illustration, examples of the method of the present invention are described below and should not be construed so as to limit the scope or spirit of the invention. Likewise, this invention is not limited to the preferred embodiment and alternatives heretofore described, to which variations and improvements may be made.

EXAMPLE 1

A gelcast suspension comprising 55 vol. % solids and a monomer solution having 20 wt. % hydroxymethlyacrylamide (HMAN). was formed. The polymerization reaction was initiated using a standard free radical initiator system of ammonium persulfate (APS) and tetramethylethlenediamine (TEMED). The specific formulation used is as follows:

| Function | Component | Amount |
| --- | --- | --- |
| Mesophase pitch powder | Conoco Pitch 7790-10D Powder | 100 g |
| Solvent | Water | 37.8 g |
| Dispersant | Emphos CS1361 (Witco Chem. Co.) | 1.5 g |
| Anti-foaming agent | Foammaster VF (hemkel) | 5 drops |
| Monofunctional monomer | Hydroxymethylacrylamide (HMAN) | 28.2 g |

The dispersant, solvent and monofunctional monomer were first combined to form the monomer solution, then supplemented with the anti-foaming agent. Mesophase pitch powder was added and the suspension was processed by mixing in a ball mill. The mill jar was a 2 liter capacity polyethylene wide mouth bottle, and the media used for milling consisted of short cylinders of aluminum oxide having a ⅜ inch diameter. The ratio of milling media loaded into the ball mill was 250 g of media to 50 g of pitch powder.

After mixing, the gelcast suspension was prepared for casting. The suspension was removed from the mill and de-aired. TEMED and APS were added at a rate of 1.0 μl of 10% APS solution and 0.1 μl TEMED per gram of suspension to initiate the polymerization reaction. The suspension was then poured into a series of rectangular and star-shaped molds previously coated with Mold Wiz® AZN mold release. Finally, the molds were placed in a 60° C. oven for polymerization.

After the solution was polymerized, the resulting parts were removed from the molds and dried for 18 hours in ambient conditions. After drying, the parts were subjected to a three stage heat treatment conducted in flowing nitrogen at approximately 1 ft$^3$/hr. The first stage was a binder burn-out stage which comprised elevating the temperature of the oven at a rate of 1° C./minute from ambient temperature to 600° C. The second stage was a high firing stage which comprised elevating the temperature from 600° C. to 1050° C. at a rate of 1° C./minute and holding at 1050° C. for one hour. The third stage was a graphitization stage which comprised elevating the temperature to 2800° C. at a rate of 10° C./minute and holding for one hour.

Figure 2:
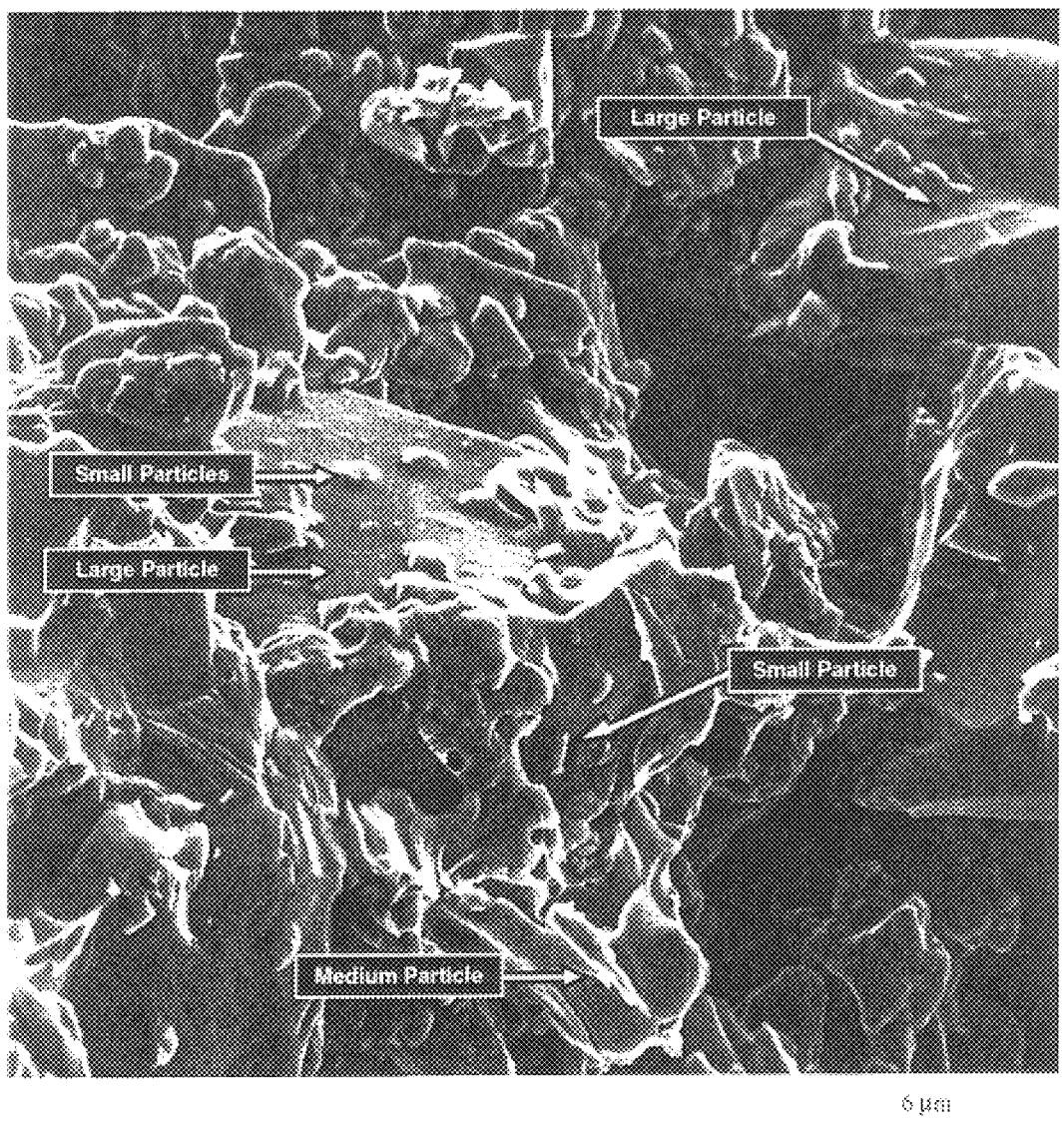
FIG. 2 is a photograph of the gelcast carbon preform microstructure taken at a medium magnification along a fracture surface after the preform was heat-treated at 2800° C.
Figure 3:
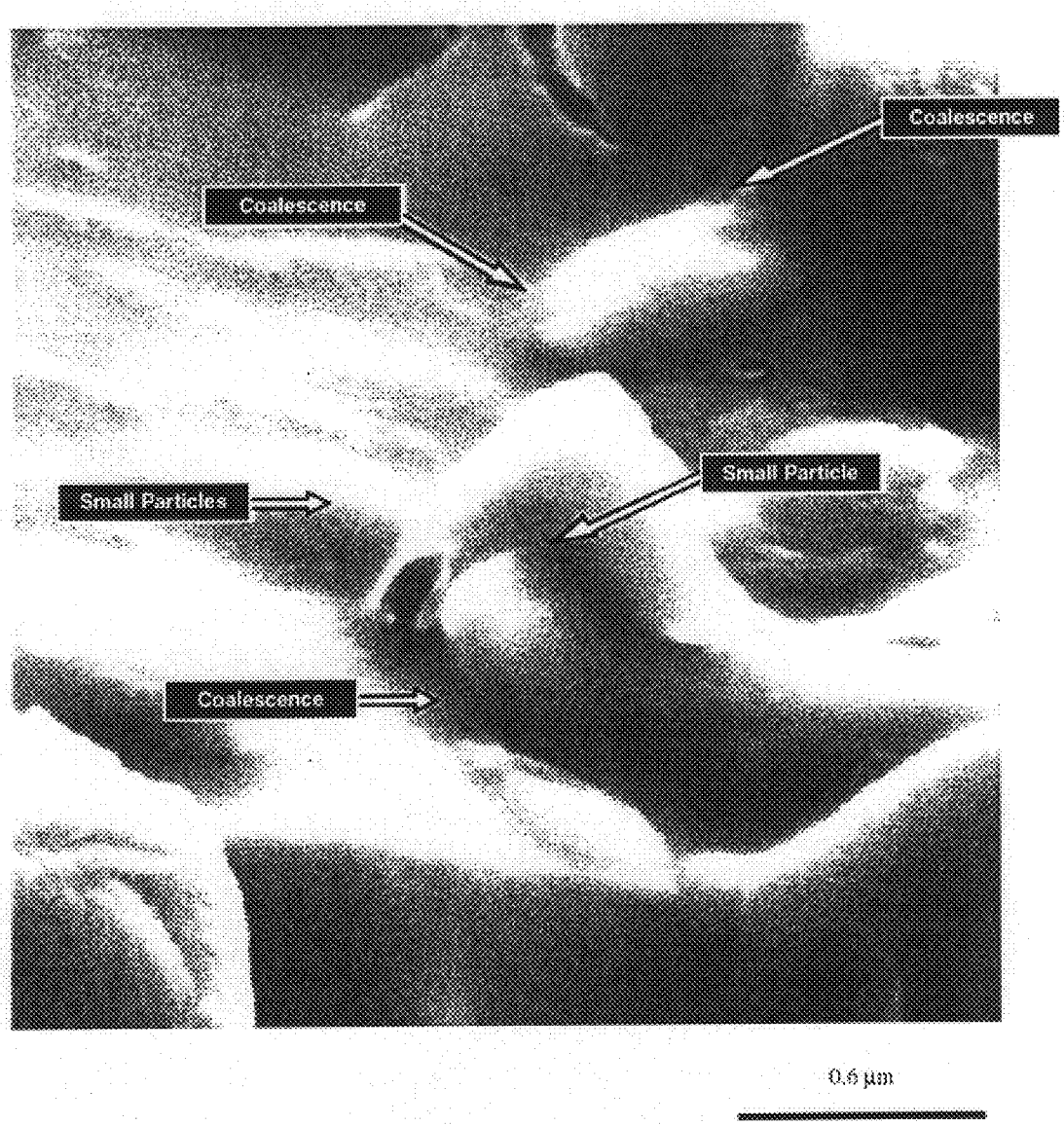
FIG. 3 is a photograph of the gelcast carbon preform microstructure taken at a high magnification along a fracture surface after the preform was heat-treated at 2800° C.

The result of this formulation yielded rectangular and star-shaped plates having a ⅛" thick cross-section. The microstructure of the material included large particles with medium and small particles tightly packed in the interstitial spaces between the large particles, as shown in FIGS. 1–3.

This unique configuration is unseen in other preforms and is believed to provide a superior quality in areas such as pore distribution, densification capabilities, strength and thermal conductivity.

It was also observed that the small, medium, and large particles had coalesced at their contact points forming a monolithic structure. FIGS. 1–3. The coalescence occurred in the temperature range between 300° C. and 600° C., after the binder burn-out stage, but while the pitch was still able to soften.

Figure 4:
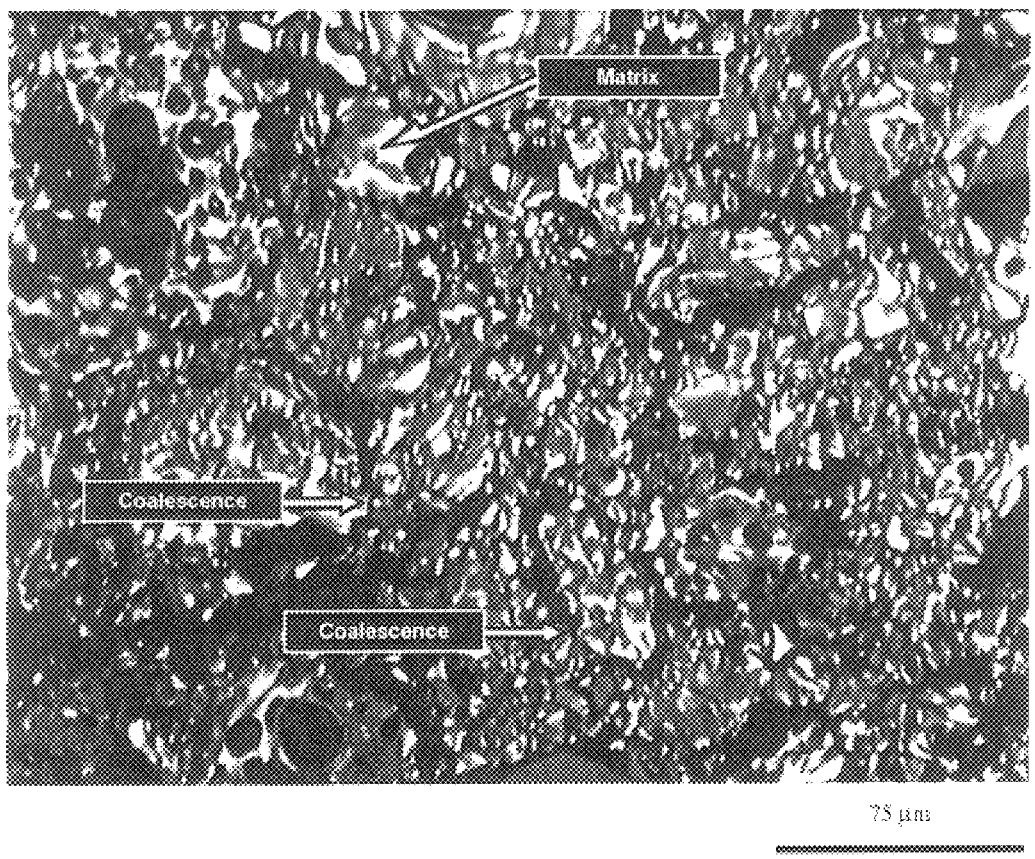
FIG. 4 is an optical micrograph with optical interference patterns (generated by cross-polarized light), of the gelcast carbon preform microstructure taken at a high magnification along a polished surface after the preform was heat-treated at 2800° C.
Figure 5:
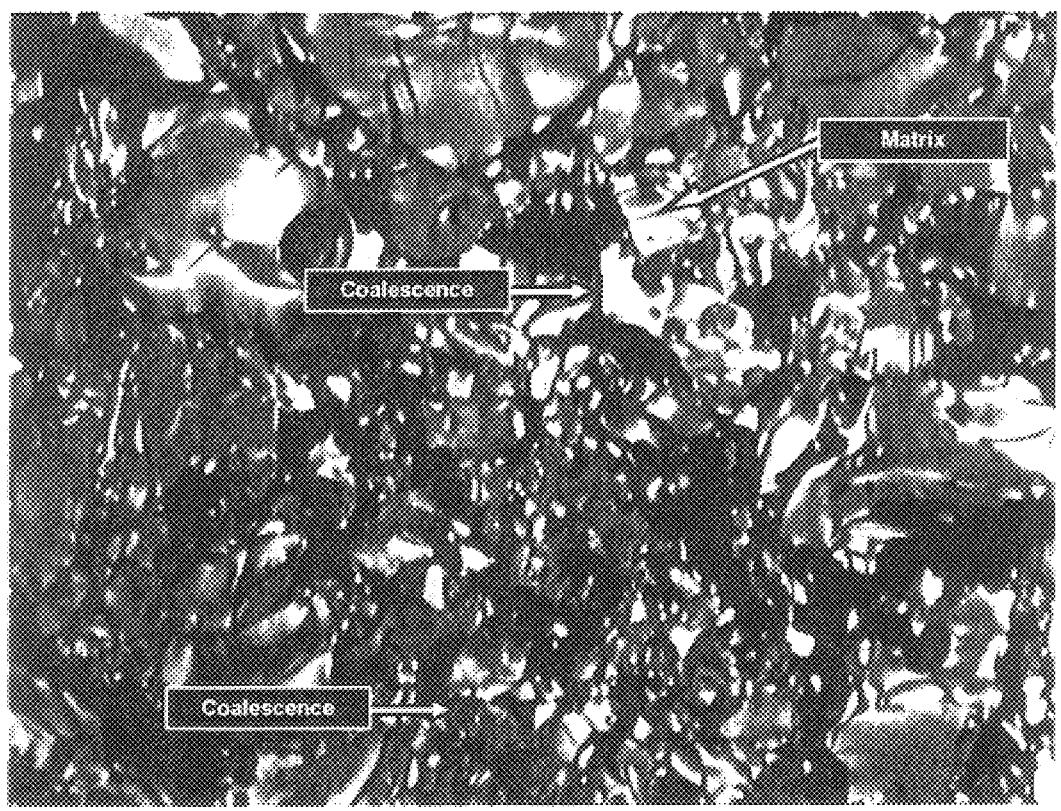
FIG. 5 is an optical micrograph with optical interference patterns (generated by cross-polarized light), of the gelcast carbon preform microstructure taken at a medium magnification along a polished surface after the preform was heat-treated at 2800° C.
Figure 6:
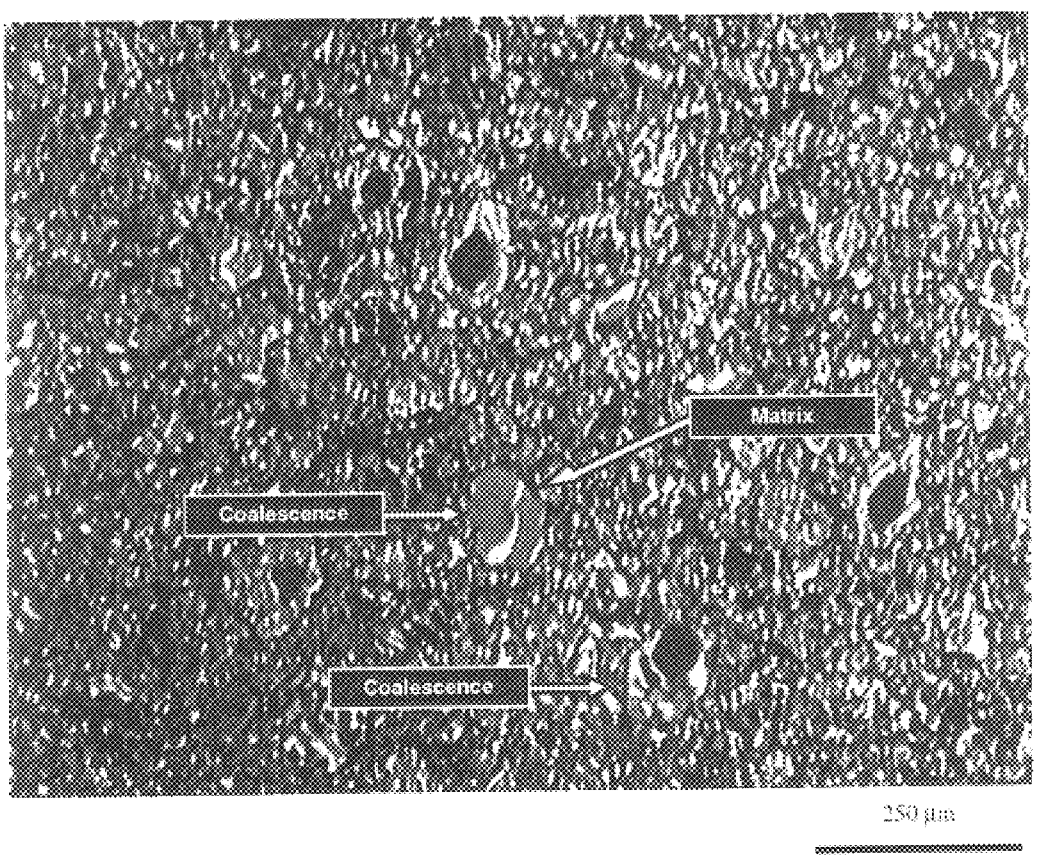
FIG. 6 is an optical micrograph with optical interference patterns (generated by cross-polarized light), of the gelcast carbon preform microstructure taken at a low magnification along a polished surface after the preform was heat-treated at 2800° C.

Finally, it was observed that the mesophase particles had converted completely to a graphitic structure, as indicated by the mosaic structure seen in optical interference patterns. FIGS. 4–6. The complete graphitic structure is believed to result in higher thermal conductivity and improved strength and stiffness, as compared to other similar products.

EXAMPLE 2

A gelcast suspension was formed having a total solids loading of 52 vol. % and a monomer solution having 20 wt. % hydroxymethlyacrylamide (HMAN). The polymerization reaction was initiated using a standard free radical initiator system of persulfate (APS) and tetramethylethlenediamine (TEMED). The formulation used is as follows:

| Function | Component | Amount |
| --- | --- | --- |
| Mesophase pitch powder | Conoco Pitch 7790-10D Powder | 63.0 g |
| Carbon Additive | Fortafil 3(c) 400 $\mu$m fibers | 66.0 g |
| Solvent | Water | 48.0 g |
| Dispersant | Emphos CS1361 (Witco) | 4 g |
| Anti-foaming agent | Foammaster VF (hemkel) | 10 drops |
| Monofunctional monomer | Hydroxymethylacrylamide | 34.0 g |

The gelcast suspension and plates were formed according to the process described in Example 1, with the exception that the mesophase pitch powder was supplemented with small carbon fibers as an additive. The overall process resulted in the formation of carbon-carbon composites having a rectangular or star design.

The resulting plates exhibited a microstructure wherein medium and small particles were tightly packed within the interstitial spaces between the large particles, as shown in FIGS. 7–9. The plates also exhibited substantial coalescence between the small, medium and large particles and excellent bonding to the carbon fibers. The coalescence and bonding pattern is believed to result in enhanced preform strength, stiffness and thermal conductivity.

A number of fibers also experienced "fiber pull-out" which normally occurs during fracture. FIGS. 7–9. During "fiber pull-out", the interface between the fiber and the carbon matrix absorbs the energy of the fracture, thereby increasing the composites toughness and strength. Fiber pull-out is indicative of predominantly good bonding between the fibers and the matrix mesophase.

The fibers also exhibited a fairly random distribution, although, there was evidence that many of the fibers were aligned together. FIG. 7. The random distribution is a result of the extensive ball milling and high volume fracture of fibers. The random distribution of fibers enhance the composites mechanical and thermal properties.

Figure 10:
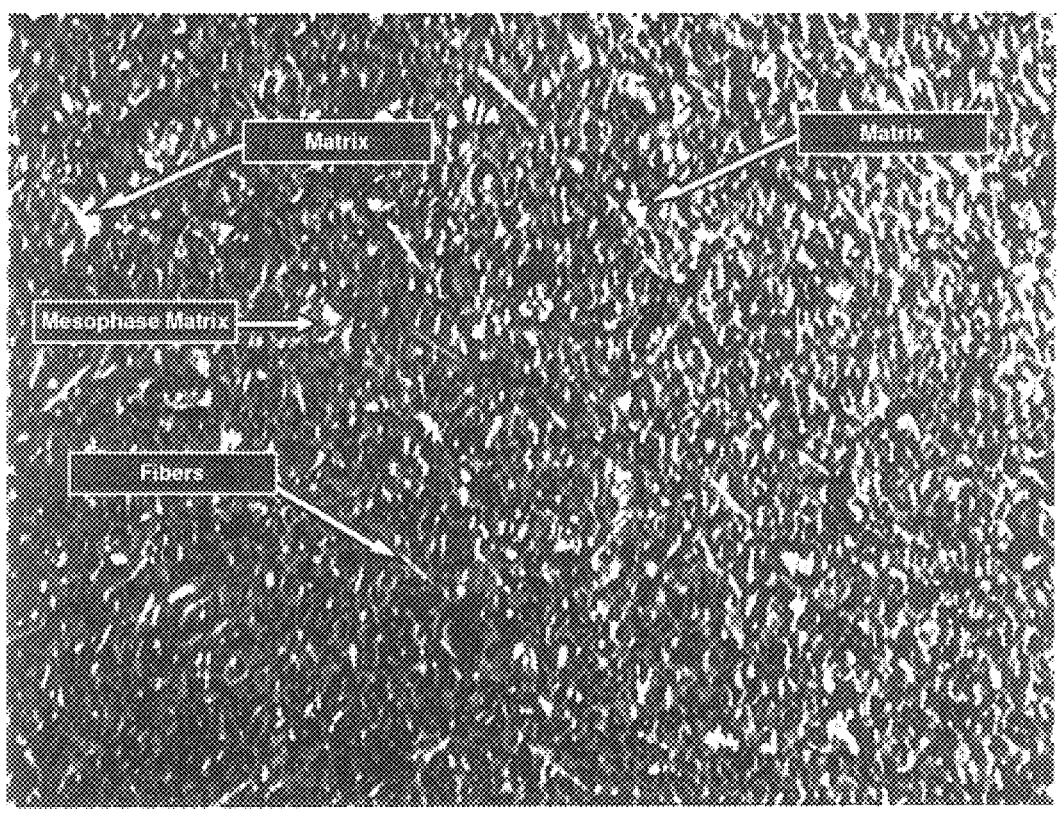
FIG. 10 is an optical micrograph with optical interference patterns (generated by cross-polarized light), of the gelcast carbon-carbon preform microstructure taken at a low magnification along a polished surface after the preform was heat-treated at is 2800° C.
Figure 11:
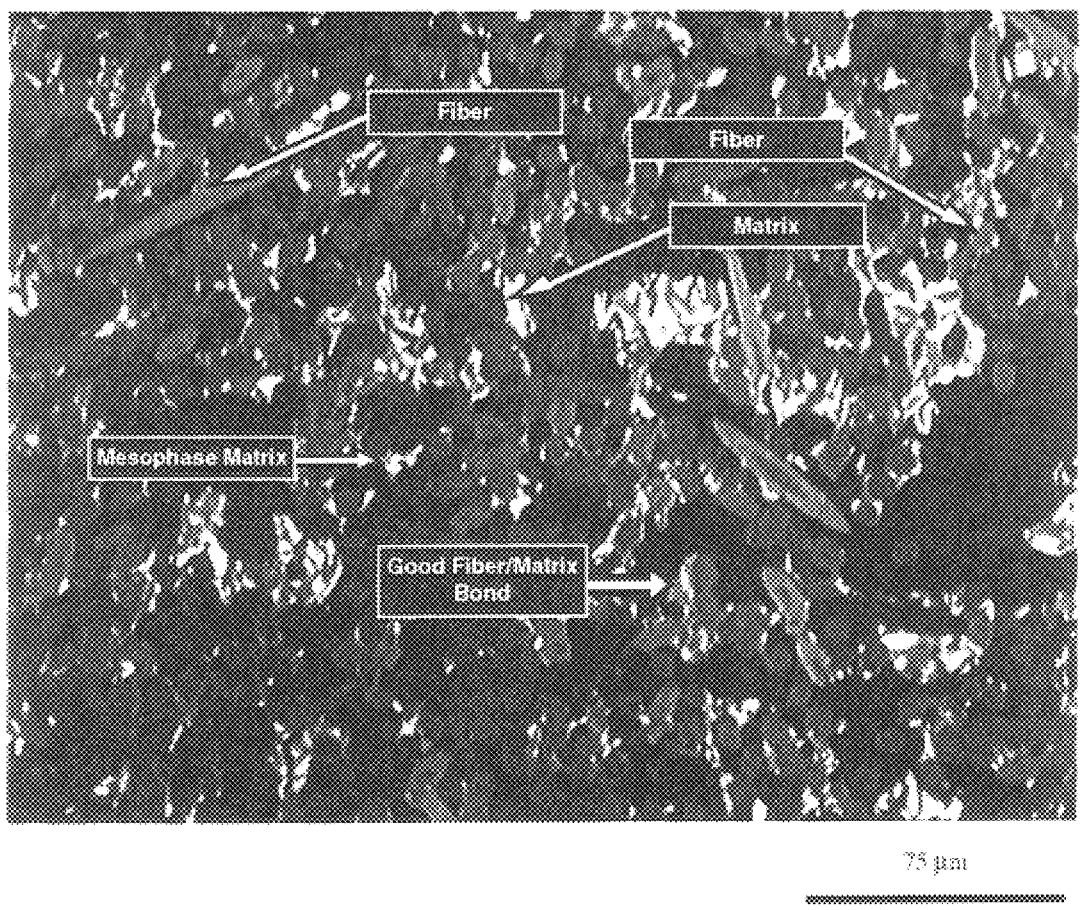
FIG. 11 is an enhanced optical micrograph with optical interference patterns (generated by cross-polarized light), of the gelcast carbon-carbon preform microstructure taken at a medium magnification along a polished surface after the preform was heat-treated at 2800° C.
Figure 12:
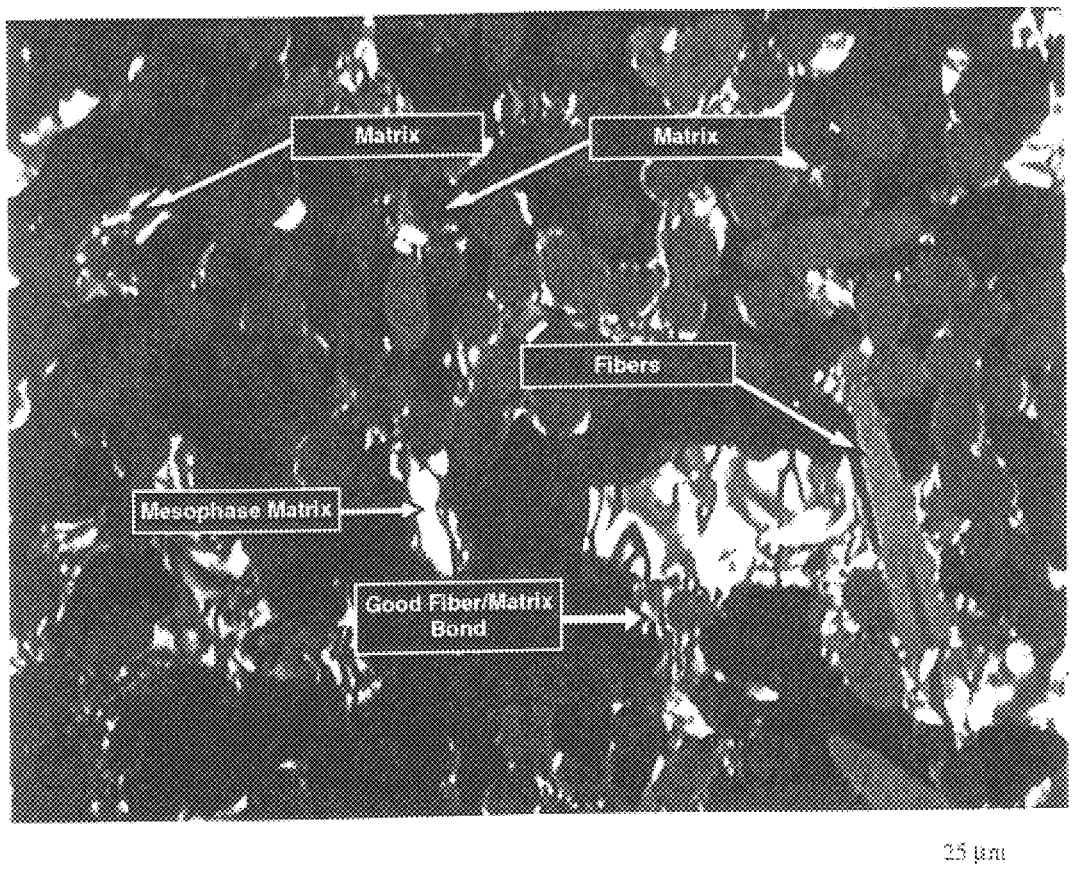
FIG. 12 is an enhanced optical micrograph with optical interference patterns (generated by cross-polarized light), of the gelcast carbon-carbon preform microstructure taken at a high magnification along a polished surface after the preform was heat-treated at 2800° C.

Finally, the mesophase matrix had completely converted to a graphitic structure. FIGS. 10–12. The complete conversion to graphite is believed to provide the preform with enhanced thermal and mechanical properties, as well as other improved properties.

It should be understood that the examples and embodiments described herein are for illustrative purposes only and that various modifications or changes will be suggested to persons skilled in the art, and that they are included within the spirit and purview of this invention. It is also understood that the invention can take other specific forms without departing from its spirit or essential attributes.

What is claimed is:

1. A method of making a carbonaceous preform, comprising the steps of:
   a) forming a fluid gelcasting suspension comprising an initiator system, a monomer solution comprising monomers and a solvent, said monomers capable of being polymerized and then later vaporized in accordance with steps (b) and (d) below, and at least one polymeric carbon precursor selected from the group consisting of mesophase pitch, isotropic pitch, solvated pitch, a blend of the aforementioned pitches, phenolics, furans, polyvinyl alcohols, polyacrylonitriles, polyimides, polyaramides, polyetheretherkeytones, polyarylacetylenes, melamines, cyanate-esters, polycyanates, and polyvinylacrylates;
   b) polymerizing the monomers in the monomer solution to form a polymer-solvent gel matrix, said polymer-solvent gel matrix providing a physical form for a solid product;
   c) drying the solid product to remove the solvent;
   d) heating the solid product to vaporize the polymerized monomers of step (b); and
   e) further heating the solid product to convert the polymeric carbon precursor to carbon.

2. The method of claim 1, comprising the additional step of further heating the solid product to convert the carbon to graphite.

3. The method of claim 2, comprising the additional step of infiltrating the solid product with a densifying material.

4. The method of claim 3, wherein the densifying material is selected from the group consisting of a polymer compound, ceramic, metal, carbon and graphite.

5. The method of claim 3, wherein the densifying material is a carbon.

6. The method of claim 5 comprising the additional step of further heating the infiltrated solid product to convert the additional carbon densifying material to graphite.

7. The method of claim 1 further comprising the step of machining the solid product prior to the step of further heating the solid product to convert the polymeric precursor to carbon.

8. The method of claim 1, comprising the additional step of infiltrating the solid product with a densifying material.

9. The method of claim 8, wherein the densifying material is selected from the group consisting of a polymer compound, ceramic, metal, carbon and graphite.

10. The method of claim 8, wherein the densifying material is a carbon.

11. The method of claim 10 comprising the additional step of further heating the infiltrated solid carbon product to convert the carbon densifying material to graphite.

12. A method of making a carbonaceous preform, comprising the steps of:
   a) making a fluid gelcasting mixture comprising at least one additive; an initiator system; a monomer solution comprising monomers and a solvent, said monomers capable of being polymerized and then later vaporized in accordance with steps (b) and (d) below; and at least one polymeric carbon precursor selected from the group consisting of mesophase pitch, isotropic pitch, solvated pitch, a blend of the aforementioned pitches, phenolics, furans, polyvinyl alcohols, polyacrylonitriles, polyimides, polyaramides, polyetheretherkeytones, polyarylacetylenes, melamines, cyanate-esters, polycyanates, and polyvinylacrylates; and b) polymerizing the monomers in the monomer solution to form a polymer-solvent gel matrix, said polymer-solvent gel matrix providing a physical form for a solid product;

c) drying the solid product to remove the solvent;

d) heating the solid product to vaporize the polymerized monomers of step (b); and e) further heating the solid product to convert the polymeric carbon precursor to carbon.

13. The method of claim 12, comprising the additional step of further heating the solid product to convert the carbon to graphite.

14. The method of claim 13, comprising the additional step of infiltrating the solid product with a densifying material.

15. The method of claim 13, comprising the additional step of infiltrating the solid product with a densifying material.

16. The method of claim 15 wherein the densifying material is selected from the group consisting of a polymer compound, ceramic, metal, carbon and graphite.

17. The method of claim 15, wherein the densifying material is a carbon.

18. The method of claim 17 comprising the additional step of further heating the infiltrated solid product to convert the carbon densifying material to graphite.

19. The method of claim 14, wherein the densifying material is selected from the group consisting of a polymer compound, ceramic, metal, carbon and graphite.

20. The method of claim 14, wherein the densifying material is a carbon.

21. The method of claim 20 comprising the additional step of further heating the infiltrated solid product to convert the additional carbon densifying material to graphite.

22. The method of claim 12 further comprising the step of machining the solid product prior to the step of further heating the solid product to convert the polymeric precursor to carbon.

23. The method of claim 12 wherein the additive is a carbon fiber.

24. The method of claim 23 wherein the carbon fiber is selected from the group consisting of mesophase pitch-based carbon fibers, isotropic pitch-based carbon fibers, solvated pitch-based carbon fibers, vapor grown carbon fibers, vapor grown carbon nanofibers, and poly(acrylonitrile) based carbon fibers.

25. The method of claim 12 wherein the additive is a selected from the group consisting of carbon particles, carbon fibers, carbon nanofibers, carbon whiskers, carbon nanotubes, carbon fullerenes, carbon flakes, graphite powders, graphite flakes, graphite mesobeads, graphite whiskers, ceramic particles, ceramic fibers, ceramic nanofibers, ceramic whiskers, ceramic nanotubes, ceramic flakes, metal particles, metal fibers, metal nanofibers, metal flakes, pre-ceramic polymers, and pre-metallic polymers.

26. A method of making a thermoplastic part comprising the steps of:

a) forming a fluid gelcasting suspension comprising an initiator system, a monomer solution comprising monomers and a solvent, said monomers capable of being polymerized and then later vaporized in accordance with steps (b) and (d) below; and at least one polymeric carbon precursor selected from the group consisting of mesophase pitch, isotropic pitch, solvated pitch, a blend of the aforementioned pitches, phenolics, furans, polyvinyl alcohols, polyacrylonitriles, polyimides, polyaramides, polyetheretherkeytones, polyarylacetylenes, melamines, cyanate-esters, polycyanates, and polyvinylacrylates;

b) polymerizing the monomers in the monomer solution to form a polymer-solvent gel matrix, said polymer-solvent gel matrix providing a physical form for a solid product;

c) drying the product to remove the solvent; and d) heating the product to vaporize the polymerized monomers of step (b).

27. The method of claim 26 wherein the polymeric carbon precursor is supplemented with an additive.

28. The method of claim 27 wherein the additive is a carbon fiber.

29. The method of claim 28 wherein the carbon fiber is selected from the group consisting of mesophase pitch-based carbon fibers, isotropic pitch-based carbon fibers, solvated pitch-based carbon fibers, vapor grown carbon fibers, vapor grown carbon nanofibers, and poly(acrylonitrile) based carbon fibers.

30. The method of claim 27 wherein the additive is a selected from the group consisting of carbon particles, carbon fibers, carbon nanofibers, carbon whiskers, carbon nanotubes, carbon fullerenes, carbon flakes, graphite powders, graphite flakes, graphite mesobeads, graphite whiskers, ceramic particles, ceramic fibers, ceramic nanofibers, ceramic whiskers, ceramic nanotubes, ceramic flakes, metal particles, metal fibers, metal nanofibers, metal flakes, pre-ceramic polymers, and pre-metallic polymers.

31. The method of claim 26, comprising the additional step of further heating the solid product to convert the polymeric carbon precursor to carbon.

32. The method of claim 31, comprising the additional step of further heating the solid product to convert the carbon to graphite.

33. The method of claim 31, comprising the additional step of infiltrating the solid product with a densifying material.

34. The method of claim 33, wherein the densifying material is selected from the group consisting of a polymer compound, ceramic, metal, carbon and graphite.

35. The method of claim 34, wherein the densifying material is a carbon.

36. The method of claim 35 comprising the additional step of further heating the infiltrated solid product to convert the carbon densifying material to graphite.

37. The method of claim 32, comprising the additional step of infiltrating the solid product with a densifying material.

38. The method of claim 37, wherein the densifying material is selected from the group consisting of a polymer compound, ceramic, metal, carbon and graphite.

39. The method of claim 37, wherein the densifying material is a carbon.

40. The method of claim 39 comprising the additional step of further heating the solid product to convert the additional carbon densifying material to graphite.

41. The method of claim 31 further comprising the step of machining the solid product prior to heating the solid product to convert the polymeric precursor to carbon.

42. The method of claim 1 wherein the monomer solution comprises monomers selected from hydroxymethylacrylamide; acrylic acid; methacrylamide; methacrylic acid; methoxy(polyethylene glycol)monomethacrylate; n-vinyl pyrrollidone; acrylamide; alkyl-acrylamides; alkyl-methacrylamides; alkyl-acrylates; alkyl-methacrylates; dimethyl aminoethyl methacrylate; dimethyl aminopropyl methacrylamide; hydroxy-alkyl acrylamides; hydroxy-alkyl methacrylamides; hydroxy-alkyl acrylates; hydroxy-alkyl methacrylates; methacrylatoethyl trimethyl ammonium chloride; methacrylamidopropryl trimethyl ammonium chloride; p-styrene sulfonic acid; and p-styrene sulfonic acid salts.

43. The method of claim 12 wherein the monomer solution comprises monomers selected from hydroxymethylacrylamide; acrylic acid; methacrylamide; methacrylic acid; methoxy(polyethylene glycol)monomethacrylate; n-vinyl pyrrollidone; acrylamide; alkyl-acrylamides; alkyl-methacrylamides; alkyl-acrylates; alkyl-methacrylates; dimethyl aminoethyl methacrylate; dimethyl aminopropyl methacrylamide; hydroxy-alkyl acrylamides; hydroxy-alkyl methacrylamides; hydroxy-alkyl acrylates; hydroxy-alkyl methacrylates; methacrylatoethyl trimethyl ammonium chloride; methacrylamidopropryl trimethyl ammonium chloride; p-styrene sulfonic acid; and p-styrene sulfonic acid salts.

44. The method of claim 26 wherein the monomer solution comprises monomers selected from hydroxymethylacrylamide; acrylic acid; methacrylamide; methacrylic acid; methoxy(polyethylene glycol)monomethacrylate; n-vinyl pyrrollidone; acrylamide; alkyl-acrylamides; alkyl-methacrylamides; alkyl-acrylates; alkyl-methacrylates; dimethyl aminoethyl methacrylate; dimethyl aminopropyl methacrylamide; hydroxy-alkyl acrylamides; hydroxy-alkyl methacrylamides; hydroxy-alkyl acrylates; hydroxy-alkyl methacrylates; methacrylatoethyl trimethyl ammonium chloride; methacrylamidopropryl trimethyl ammonium chloride; p-styrene sulfonic acid; and p-styrene sulfonic acid salts.

45. A method of making a carbonaceous preform, comprising the steps of:
   a) forming a fluid gelcasting suspension comprising at least one polymeric carbon precursor; an initiator system; and a monomer solution comprising monomers and a solvent, said monomers selected from the group consisting of hydroxymethylacrylamide, acrylic acid, methacrylamide, methacrylic acid, methoxy (polyethylene glycol)monomethacrylate, n-vinyl pyrrollidone, acrylamide, alkyl-acrylamides, alkyl-methacrylamides, alkyl-acrylates, alkyl-methacrylates, dimethyl aminoethyl methacrylate, dimethyl aminopropyl methacrylamide, hydroxy-alkyl acrylamides, hydroxy-alkyl methacrylamides, hydroxy-alkyl acrylates, hydroxy-alkyl methacrylates, methacrylatoethyl trimethyl ammonium chloride, methacrylamidopropryl trimethyl ammonium chloride, p-styrene sulfonic acid, and p-styrene sulfonic acid salts, and capable of being polymerized and then later vaporized in accordance with steps (b) and (d) below;
   b) polymerizing the monomers in the monomer solution to form a polymer-solvent gel matrix, said polymer-solvent gel matrix providing a physical form for a solid product;
   c) drying the solid product to remove the solvent;
   d) heating the solid product to vaporize the polymerized monomers of step (b); and
   e) further heating the solid product to convert the polymeric carbon precursor to carbon.

46. The method of claim 45, comprising the additional step of further heating the solid product to convert the carbon to graphite.

47. The method of claim 45, comprising the additional step of infiltrating the solid product with a densifying material.

48. The method of claim 47, wherein the densifying material is selected from the group consisting of a polymer compound, ceramic, metal, carbon and graphite.

49. The method of claim 47, wherein the densifying material is a carbon.

50. The method of claim 49 comprising the additional step of further heating the infiltrated carbon solid product to convert the carbon densifying material to graphite.

51. The method of claim 46, comprising the additional step of infiltrating the solid product with a densifying material.

52. The method of claim 51, wherein the densifying material is selected from the group consisting of a polymer compound, ceramic, metal, carbon and graphite.

53. The method of claim 51, wherein the densifying material is a carbon.

54. The method of claim 53 comprising the additional step of further heating the infiltrated solid product to convert the additional carbon densifying material to graphite.

55. The method of claim 45 wherein the polymeric carbon precursor is selected from the group consisting of mesophase pitch, isotropic pitch, solvated pitch, a blend of the aforementioned pitches, phenolics, furans, polyvinyl alcohols, polyacrylonitriles, polyimides, polyaramides, polyetherethkeyture, polyarylacetylene, melamines, cyanate-esters, polycyanate, and polyvinylacrylates.

56. The method of claim 45 further comprising the step of machining the solid product prior to the step of further heating the product to convert the polymeric precursor to carbon.

57. A method of making a carbonaceous preform, comprising the steps of:
   a) making a fluid gelcasting mixture comprising at least one polymeric carbon precursor; at least one additive; an initiator system; and a monomer solution comprising monomers and a solvent, said monomers selected from the group consisting of hydroxymethylacrylamide, acrylic acid, methacrylamide, methacrylic acid, methoxy (polyethylene glycol)monomethacrylate, n-vinyl pyrrollidone, acrylamide, alkyl-acrylamides, alkyl-methacrylamides, alkyl-acrylates, alkyl-methacrylates, dimethyl aminoethyl methacrylate, dimethyl aminopropyl methacrylamide, hydroxy-alkyl acrylamides, hydroxy-alkyl methacrylamides, hydroxy-alkyl acrylates, hydroxy-alkyl methacrylates, methacrylatoethyl trimethyl ammonium chloride, methacrylamidopropryl trimethyl ammonium chloride, p-styrene sulfonic acid, and p-styrene sulfonic acid salts, and capable of being polymerized and then later vaporized in accordance with steps (b) and (d) below; and
   b) polymerizing the monomers in the monomer solution to form a polymer-solvent gel matrix, said polymer-solvent gel matrix providing a physical form for a solid product;
   c) drying the solid product to remove the solvent;
   d) heating the solid product to vaporize the polymerized monomers of step (b); and
   e) further heating the solid product to convert the polymeric carbon precursor to carbon.

58. The method of claim 57, comprising the additional step of further heating the solid product to convert the carbon to graphite.

59. The method of claim 57, comprising the additional step of infiltrating the solid product with a densifying material.

60. The method of claim 59 wherein the densifying material is selected from the group consisting of a polymer compound, ceramic, metal, carbon and graphite.

61. The method of claim 59, wherein the densifying material is a carbon.

62. The method of claim 61 comprising the additional step of further heating the infiltrated solid product to convert the carbon densifying material to graphite.

63. The method of claim 58, comprising the additional step of infiltrating the solid product with a densifying material.

64. The method of claim 63, wherein the densifying material is selected from the group consisting of a polymer compound, ceramic, metal, carbon and graphite.

65. The method of claim 63, wherein the densifying material is a carbon.

66. The method of claim 65 comprising the additional step of further heating the infiltrated solid product to convert the additional carbon densifying material to graphite.

67. The method of claim 57 wherein the polymeric carbon precursor is selected from the group consisting of mesophase pitch, isotropic pitch, solvated pitch, a blend of the aforementioned pitches, phenolics, furans, polyvinyl alcohols, polyacrylonitriles, polyimides, polyaramides, polyetherethkeyture, polyarylacetylene, melamines, cyanate-esters, polycyanate, and polyvinylacrylates.

68. The method of claim 57 further comprising the step of machining the solid product prior to the step of further heating the product to convert the polymeric precursor to carbon.

69. The method of claim 57 wherein the additive is a carbon fiber.

70. The method of claim 69 wherein the carbon fiber is selected from the group consisting of mesophase pitch-based carbon fibers, isotropic pitch-based carbon fibers, solvated pitch-based carbon fibers, vapor grown carbon fibers, vapor grown carbon nanofibers, and poly(acrylonitrile) based carbon fibers.

71. The method of claim 57 wherein the additive is a selected from the group consisting of carbon particles, carbon fibers, carbon nanofibers, carbon whiskers, carbon nanotubes, carbon fullerenes, carbon flakes, graphite powders, graphite flakes, graphite mesobeads, graphite whiskers, ceramic particles, ceramic fibers, ceramic nanofibers, ceramic whiskers, ceramic nanotubes, ceramic flakes, metal particles, metal fibers, metal nanofibers, metal flakes, pre-ceramic polymers, and pre-metallic polymers.

72. A method of making a thermoplastic part comprising the steps of:
  a) forming a fluid gelcasting suspension comprising at least one polymeric carbon precursor; an initiator system; and a monomer solution comprising monomers and a solvent, said monomers selected from the group consisting of hydroxymethylacrylamide, acrylic acid, methacrylamide, methacrylic acid, methoxy (polyethylene glycol)monomethacrylate, n-vinyl pyrrollidone, acrylamide, alkyl-acrylamides, alkyl-methacrylamides, alkyl-acrylates, alkyl-methacrylates, dimethyl aminoethyl methacrylate, dimethyl aminopropyl methacrylamide, hydroxy-alkyl acrylamides, hydroxy-alkyl methacrylamides, hydroxy-alkyl acrylates, hydroxy-alkyl methacrylates, methacrylato-ethyl trimethyl ammonium chloride, methacrylamidopropryl trimethyl ammonium chloride, p-styrene sulfonic acid, and p-styrene sulfonic acid salts, and capable of being polymerized and then later vaporized in accordance with steps (b) and (d) below;
  b) polymerizing the monomers in the monomer solution to form a polymer-solvent gel matrix, said polymer-solvent gel matrix providing a physical form for a solid product;
  c) drying the product to remove the solvent; and
  d) heating the product to vaporize the polymerized monomers of step (b).

73. The method of claim 72, comprising the additional step of further heating the solid product to convert the polymeric carbon precursor to carbon.

74. The method of claim 73, comprising the additional step of further heating the solid product to convert the carbon to graphite.

75. The method of claim 72, comprising the additional step of infiltrating the solid product with a densifying material.

76. The method of claim 75, wherein the densifying material is selected from the group consisting of a polymer compound, ceramic, metal, carbon and graphite.

77. The method of claim 76, wherein the densifying material is a carbon.

78. The method of claim 77 comprising the additional step of further heating the infiltrated solid product to convert the carbon densifying material to graphite.

79. The method of claim 74, comprising the additional step of infiltrating the solid product with a densifying material.

80. The method of claim 79, wherein the densifying material is selected from the group consisting of a polymer compound, ceramic, metal, carbon and graphite.

81. The method of claim 79, wherein the densifying material is a carbon.

82. The method of claim 81 comprising the additional step of further heating the solid product to convert the additional carbon densifying material to graphite.

83. The method of claim 72 wherein the polymeric carbon precursor is selected from the group consisting of mesophase pitch, isotropic pitch, solvated pitch, a blend of the aforementioned pitches, phenolics, furans, polyvinyl alcohols, polyacrylonitriles, polyimides, polyaramides, polyetherethkeyture, polyarylacetylene, melamines, cyanate-esters, polycyanate, and polyvinylacrylates.

84. The method of claim 72 wherein the polymeric carbon precursor is supplemented with an additive.

85. The method of claim 84 wherein the additive is a carbon fiber.

86. The method of claim 85 wherein the carbon fiber is selected from the group consisting of mesophase pitch-based carbon fibers, isotropic pitch-based carbon fibers, solvated pitch-based carbon fibers, vapor grown carbon fibers, vapor grown carbon nanofibers, and poly(acrylonitrile) based carbon fibers.

87. The method of claim 84 wherein the additive is a selected from the group consisting of carbon particles, carbon fibers, carbon nanofibers, carbon whiskers, carbon nanotubes, carbon fullerenes, carbon flakes, graphite powders, graphite flakes, graphite mesobeads, graphite whiskers, ceramic particles, ceramic fibers, ceramic nanofibers, ceramic whiskers, ceramic nanotubes, ceramic flakes, metal particles, metal fibers, metal nanofibers, metal flakes, pre-ceramic polymers, and pre-metallic polymers.

88. The method of claim 73 further comprising the step of machining the solid product prior to heating the product to convert the polymeric precursor to carbon.

* * * * *

UNITED STATES PATENT AND TRADEMARK OFFICE
CERTIFICATE OF CORRECTION

PATENT NO. : 6,491,891 B1
DATED : January 21, 2003
INVENTOR(S) : James W. Klett et al.

It is certified that error appears in the above-identified patent and that said Letters Patent is hereby corrected as shown below:

Column 13,
Line 24, "The method of claim 13" should read -- The method of claim 12 --.

Signed and Sealed this

Twelfth Day of October, 2004

JON W. DUDAS
*Director of the United States Patent and Trademark Office*